United States Patent
Yamada et al.

(10) Patent No.: US 10,204,648 B2
(45) Date of Patent: Feb. 12, 2019

(54) FLEXURE CHAIN BLANK SHEET FOR DISK DRIVE SUSPENSION

(71) Applicant: NHK SPRING CO., LTD., Yokohama-shi, Kanagawa (JP)

(72) Inventors: Yukie Yamada, Aiko-gun (JP); Takumi Karasawa, Aiko-gun (JP)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 608 days.

(21) Appl. No.: 14/867,691

(22) Filed: Sep. 28, 2015

(65) Prior Publication Data
US 2016/0111117 A1  Apr. 21, 2016

(30) Foreign Application Priority Data
Oct. 15, 2014 (JP) ................. 2014-210684

(51) Int. Cl.
*G11B 5/48* (2006.01)

(52) U.S. Cl.
CPC ............ *G11B 5/4833* (2013.01); *G11B 5/486* (2013.01); *Y10T 428/11* (2015.01)

(58) Field of Classification Search
CPC ...... G11B 5/4833; G11B 5/486; Y10T 428/11
See application file for complete search history.

(56) References Cited

U.S. PATENT DOCUMENTS

2015/0216039 A1* 7/2015 Terada ............... H05K 3/0097
174/255

FOREIGN PATENT DOCUMENTS

| JP | 5273271 B1 | 8/2013 |
| JP | 5365944 B1 | 12/2013 |

OTHER PUBLICATIONS

Machine translation of detailed description of JP5365944 acquired Mar. 6, 2018.*
Machine translation of detailed description of JP5273271 acquired Mar. 6, 2018.*

* cited by examiner

*Primary Examiner* — Gerard Higgins
(74) *Attorney, Agent, or Firm* — Holtz, Holtz & Volek PC

(57) ABSTRACT

A flexure chain blank sheet includes frame units. Each frame unit includes a frame portion, and flexure elements. The flexure element includes a distal end portion, and an extending portion. The frame portion includes a pair of lengthwise frames and a pair of lateral frames. The first lateral frame connects between tail portions of the flexure elements. The second lateral frame is formed of a distal end linking portion which is constituted by connecting between respective adjacent extending portions. The distal end linking portion includes first cut-off portions to be cut along a longitudinal direction between the adjacent extending portions, and second cut-off portions to be cut along a width direction between the distal end portion and the extending portion.

2 Claims, 8 Drawing Sheets

FLEXURE CHAIN BLANK SHEET FOR DISK DRIVE SUSPENSION

CROSS-REFERENCE TO RELATED APPLICATIONS

This application is based upon and claims the benefit of priority from prior Japanese Patent Application No. 2014-210684, filed Oct. 15, 2014, the entire contents of which are incorporated herein by reference.

BACKGROUND OF THE INVENTION

1. Field of the Invention

The present invention relates to a flexure chain blank sheet for a disk drive suspension used for manufacturing a flexure of a disk drive suspension.

2. Description of the Related Art

A hard disk drive (HDD) is used in an information processing apparatus such as a personal computer. The hard disk drive comprises a magnetic disk rotatable about a spindle, a carriage turnable about a pivot, etc. On an arm of the carriage, a disk drive suspension (which will be hereinafter simply referred to as a suspension) is provided. The suspension comprises elements such as a load beam, and a flexure disposed to overlap the load beam. A magnetic head including a slider is mounted on a gimbal portion formed near a distal end of the flexure. The magnetic head is provided with elements for accessing data, that is, for reading and writing data. The load beam and the flexure, etc., constitute a head gimbal assembly.

Various types of flexures have been put to practical use according to the required specification. As an example of a flexure, a flexure with conductors is known. The flexure with conductors includes a metal base made of a thin stainless steel plate, an insulating layer made of an electrically insulating material, such as polyimide, which is formed on the metal base, a plurality of conductors formed on the insulating layer, etc. The flexure includes a proximal portion which overlaps the load beam, and a tail portion (a flexure tail) which extends toward the rear of a baseplate.

Conventionally, as a means for enhancing the manufacturing efficiency of the flexure, a flexure chain blank sheet disclosed in, for example, JP 5,273,271 B (Patent Literature 1) and JP 5,365,944 B (Patent Literature 2) is known. In order to manufacture the flexure chain blank sheet, a number of flexure elements having the same shape are formed by etching a stainless steel plate, for example. An example of the flexure chain blank sheet is constituted by arranging a plurality of frame units longitudinally or laterally relative to the flexure chain blank sheet. Each of the frame units is constituted by a frame portion and a number of flexure elements arranged at a predetermined pitch within the frame portion.

The frame portion of the frame unit of the flexure chain blank sheet commonly includes a pair of lengthwise frames that agrees with the longitudinal direction (dimension) of the flexure element, and a pair of lateral frames that agrees with the lateral direction (dimension) of the flexure element. These lengthwise frames and lateral frames are portions dedicated to frames different from the flexure elements, and they are eventually removed by cutting and become scrap. The more the width of the lateral frame (i.e., the dimension orthogonal to the longitudinal dimension of the lateral frame) is increased, the longer the frame unit becomes, and consequently, the length of one flexure chain blank sheet is also increased.

Depending on an apparatus or a jig to be used in the manufacturing process of the flexure, the size of a single flexure chain blank sheet may be restricted. For example, if the length of the flexure chain blank sheet is increased in even the slightest terms, the number of frame units which can be formed in a flexure chain blank sheet must be reduced by one. In one frame unit, since a number of (several tens to several hundreds of) flexure elements which are formed by etching are arranged at a predetermined pitch, reducing the frame unit by one means reducing several tens to several hundreds of flexures per flexure chain blank sheet. Accordingly, there arises a problem that the manufacturing efficiency of flexures is drastically reduced.

BRIEF SUMMARY OF THE INVENTION

Accordingly, the object of the present invention is to provide a flexure chain blank sheet for a disk drive suspension which can keep the number of frame units as it is even if the length of a flexure is slightly increased by enabling the frame portion of the frame unit to be compact.

An embodiment relates to a flexure chain blank sheet for a disk drive suspension comprising a plurality of frame units, and each of the frame units comprises a frame portion made of a stainless steel plate, and a plurality of flexure elements arranged at a predetermined pitch within the frame portion. Each of the flexure elements includes a metal base formed of a stainless steel plate, which is the same material as the frame portion, a conductive circuit portion formed on the metal base, a distal end portion, and an extending portion extending from the distal end portion. The frame portion includes a pair of lengthwise frames extending in a longitudinal direction of the flexure elements, a first lateral frame which extends in a width direction of the flexure elements and connects between tail portions of the respective flexure elements, and a second lateral frame formed of a distal end linking portion which is constituted by connecting between extending portions of the respective flexure elements. The distal end linking portion comprises first cut-off portions to be cut along the longitudinal direction between the extending portions which are adjacent to each other, and second cut-off portions to be cut along the width direction between the distal end portion and the extending portion.

According to this embodiment, since the distal end linking portion which is constituted by connecting between the extending portions of the flexure elements is used as the lateral frame, the frame portion can be made compact. Accordingly, even if the length of a flexure element is slightly increased, the number of frame units formed on one flexure chain blank sheet can be kept as it is. Therefore, when a flexure is manufactured by using the flexure chain blank sheet, it becomes possible to use a flexure chain blank sheet including more flexure elements, and production of the flexures can be carried out efficiently.

In one embodiment, the flexure chain blank sheet comprises a first opening formed between the adjacent extending portions of the flexure elements, and first bridge portions facing the first opening. The first bridge portions connect between the adjacent extending portions of the flexure elements, and include the first cut-off portions. In this embodiment, the flexure chain blank sheet comprises a second opening formed in each of the extending portions, and second bridge portions facing the second opening. The second bridge portions connect between the distal end portion and the extending portion, and include the second cut-off portions. Further, a first positioning hole may be formed in the first lateral frame, and a second positioning hole may be formed in the extending portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A flexure chain blank sheet according to one embodiment will be hereinafter described with reference to FIGS. 1 to 11.

Figure 1:
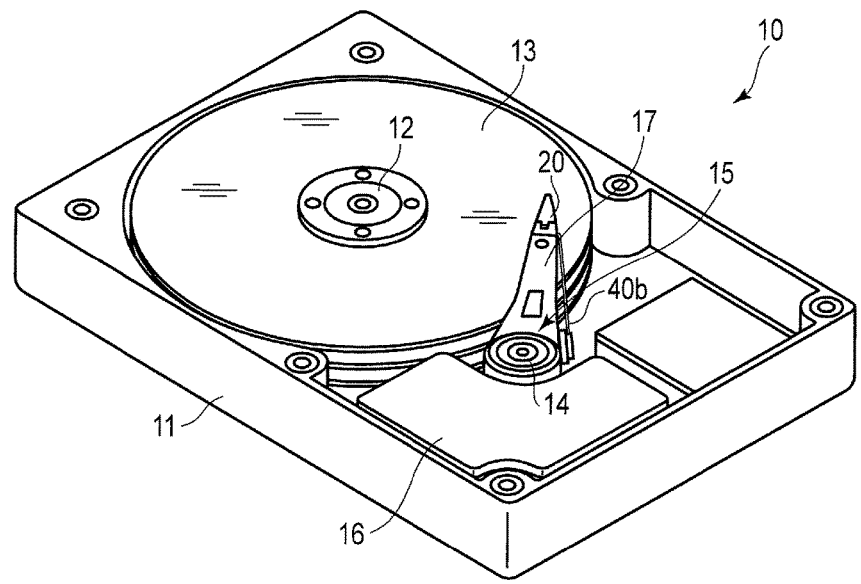
FIG. 1 is a perspective view showing an example of a disk drive.

A hard disk drive (HDD) 10 shown in FIG. 1 comprises a case 11, disks 13 rotatable about a spindle 12, a carriage 15 turnable about a pivot 14, and a positioning motor 16 for turning the carriage 15. The case 11 is sealed by a lid (not shown).

Figure 2:
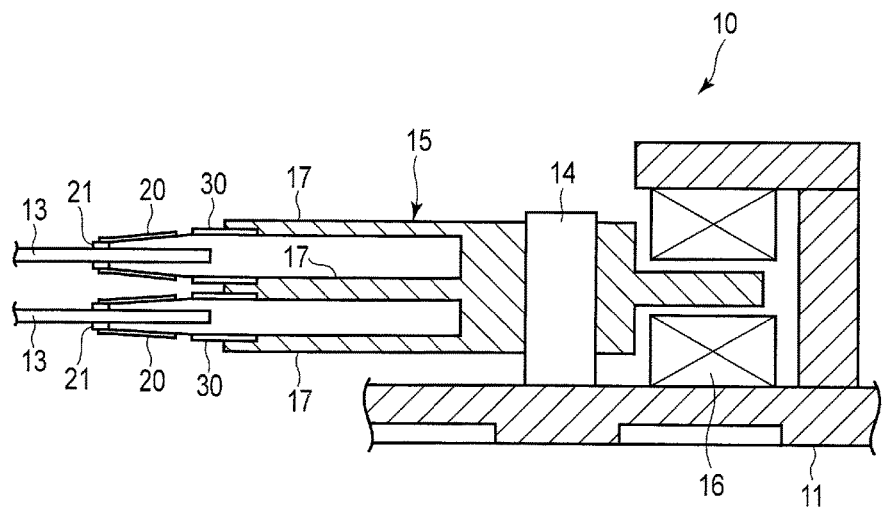
FIG. 2 is a cross-sectional view of a part of the disk drive shown in FIG. 1.

FIG. 2 is a cross-sectional view schematically showing a part of the disk drive 10. The carriage 15 is provided with arms 17. At a distal end portion of each arm 17, a disk drive suspension (hereinafter simply referred to as a suspension) 20 is mounted. At a distal end of the suspension 20, a slider 21 which serves as a magnetic head is provided. As each disk 13 rotates at high speed, an air bearing is formed between the disk 13 and the slider 21.

If the carriage 15 is turned by the positioning motor 16, the suspension 20 moves radially relative to the disk 13, and the slider 21 thereby moves to a desired track of the disk 13. The slider 21 is provided with a magnetic coil for recording data on the disk 13, a magneto resistive (MR) element for reading data recorded on the disk 13, etc. The MR element converts a magnetic signal recorded on the disk 13 into an electrical signal.

Figure 3:
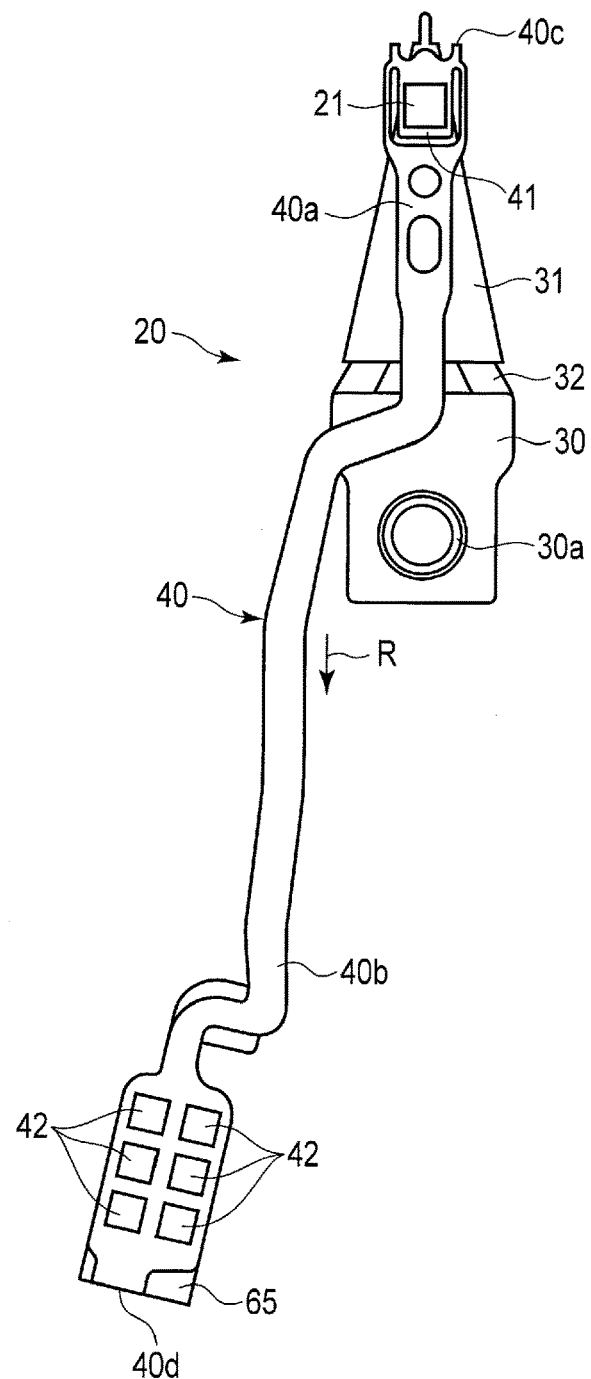
FIG. 3 is a plan view showing an example of a suspension.

FIG. 3 shows an example of the suspension 20. The suspension 20 comprises a baseplate 30, a load beam 31, a hinge portion 32, and a flexure 40 with conductors. The flexure 40 with conductors may be simply referred to as the flexure 40. A boss portion 30a of the baseplate 30 is secured to the arm 17 (FIGS. 1 and 2) of the carriage 15.

Figure 4:
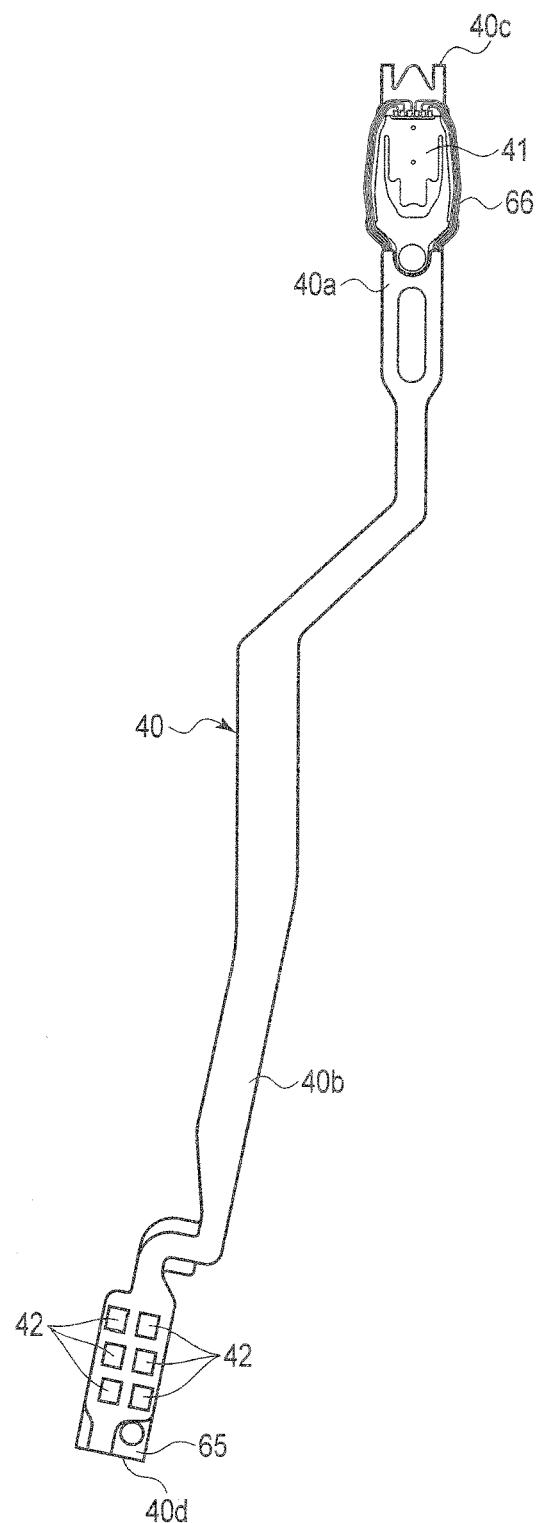
FIG. 4 is a plan view of a flexure of the suspension shown in FIG. 3.

FIG. 4 shows the flexure 40. The flexure 40 includes a proximal portion 40a overlapping the load beam 31 (FIG. 3), and a tail portion 40b extending toward the back (i.e., in the direction indicated by arrow R in FIG. 3) of the baseplate 30 from the proximal portion 40a. The proximal portion 40a of the flexure 40 is secured to the load beam 31 by fixing means such as laser welding. A tongue 41 is formed near a distal end portion 40c of the flexure 40. The slider 21 (FIGS. 2 and 3) is mounted on the tongue 41. A plurality of tail electrodes 42 are formed in the tail portion 40b.

Figure 5:
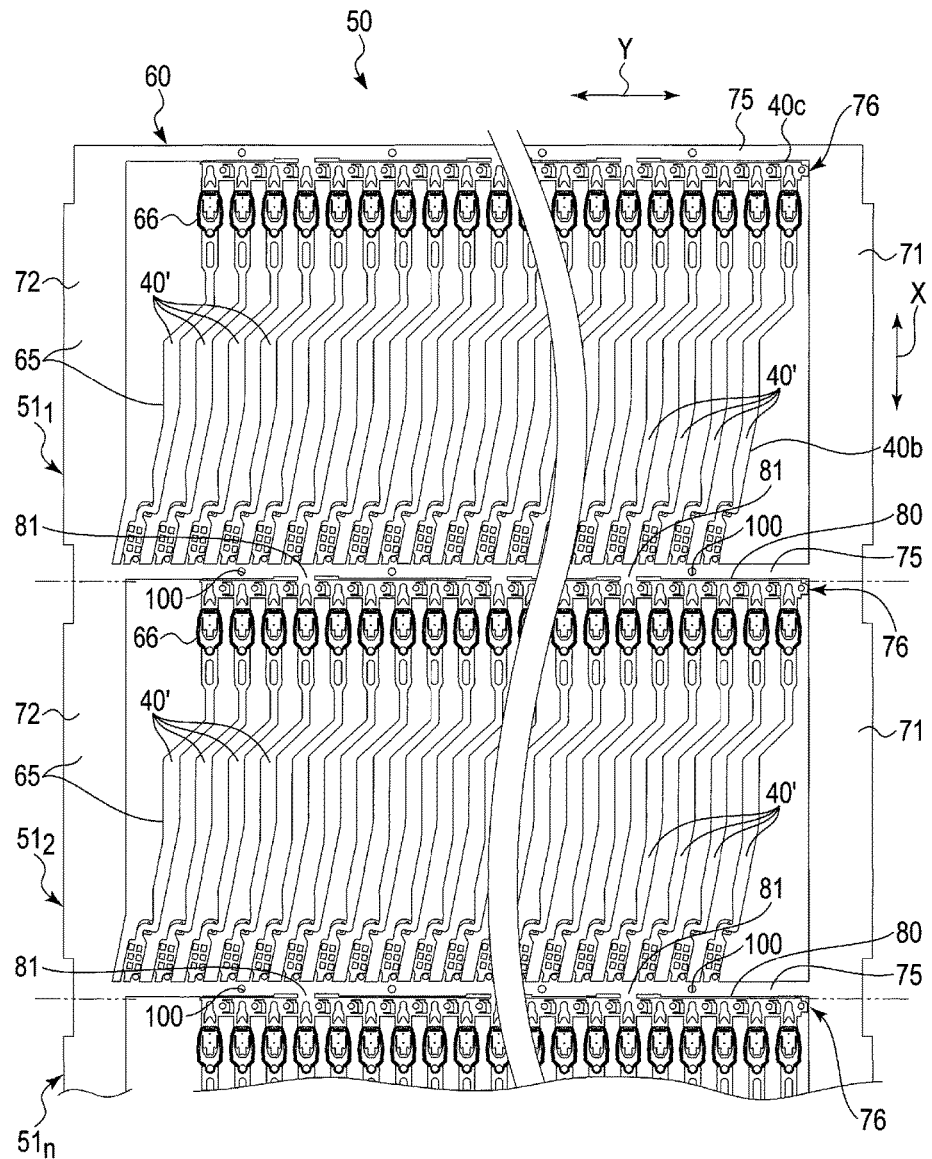
FIG. 5 is a plan view of a part of a flexure chain blank sheet according to one embodiment.
Figure 6:
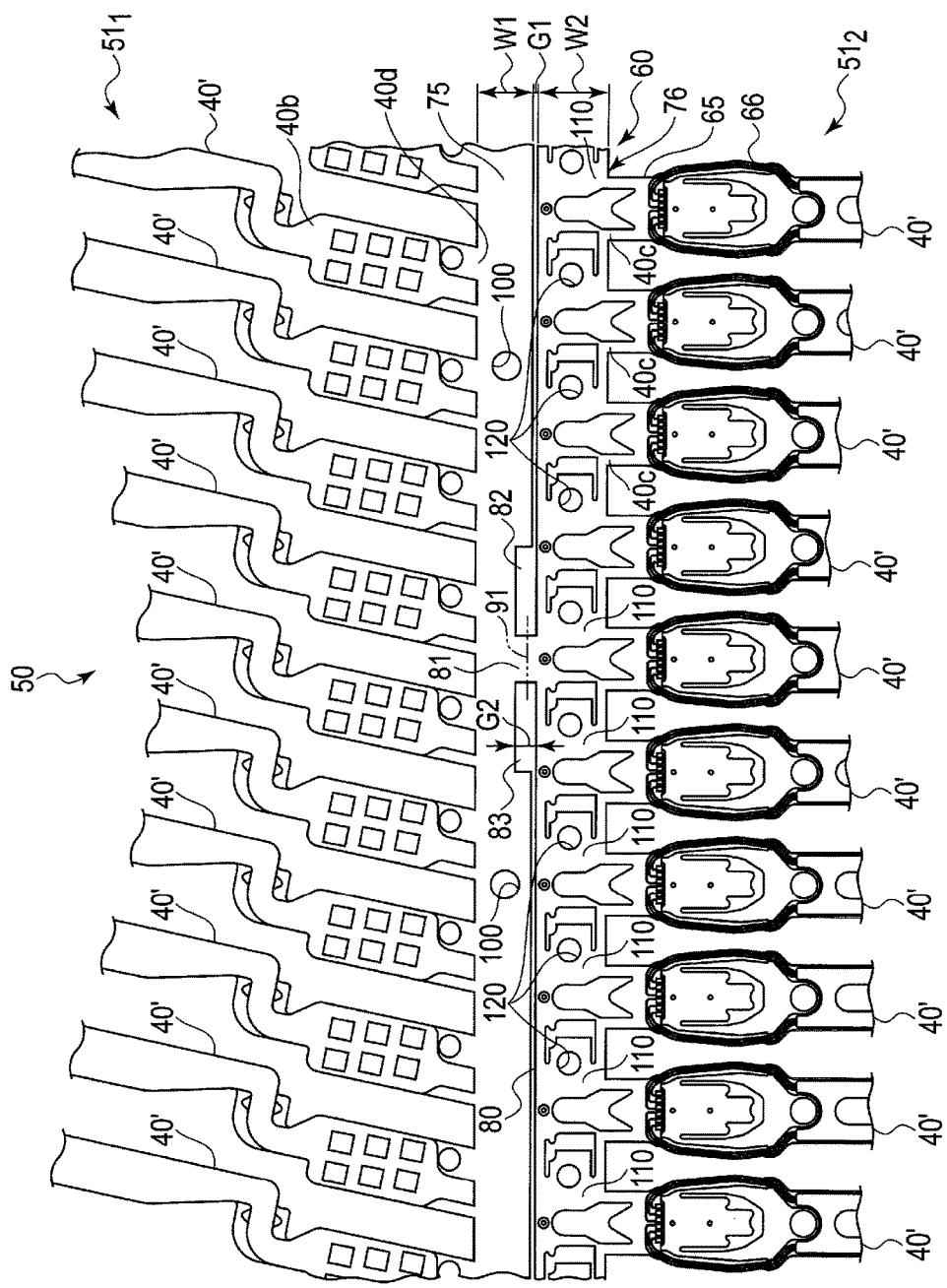
FIG. 6 is a partial enlarged view of the flexure chain blank sheet shown in FIG. 5.

FIG. 5 is a plan view showing a part of a flexure chain blank sheet 50 used in a process of manufacturing the flexure 40. FIG. 6 is a partial enlarged view of the flexure chain blank sheet 50. The flexure chain blank sheet 50 includes a plurality of frame units $51_1$ to $51_n$. Each of these frame units $51_1$ to $51_n$ includes a frame portion 60 formed by etching a metal plate (for example, a stainless steel plate), and a plurality of (several tens to several hundreds of) flexure elements 40' formed at a predetermined pitch within the frame portion 60. An example of the metal plate is formed of austenitic stainless steel, and an example of the thickness is 18 μm (12 to 25 μm).

The frame units $51_1$ to $51_n$ include the frame portions 60 formed around the frame units $51_1$ to $51_n$, respectively, and a number of (several tens to several hundreds) of flexure elements 40' arranged at a predetermined pitch within their respective frame portions 60. Each of the flexure elements 40' includes a metal base 65 obtained by etching the metal plate (stainless steel plate), and a conductive circuit portion 66 formed on the metal base 65. The conductive circuit portion 66 includes an insulating layer formed on the metal base 65, a plurality of conductors made of copper which are formed on the insulating layer, and an electrically insulating cover layer covering these conductors.

The frame portion 60 includes a first lengthwise frame 71 and a second lengthwise frame 72 which are parallel to each other, and a first lateral frame 75 and a second lateral frame 76 which are parallel to each other. Each of the first lengthwise frame 71 and the second lengthwise frame 72 extends longitudinally relative to the flexure element 40' (i.e., in a longitudinal direction as indicated by double-headed arrow X in FIG. 5.) Each of the first lateral frame 75 and the second lateral frame 76 extends laterally relative to the flexure element 40' (i.e., in a width direction as indicated by double-headed arrow Y in FIG. 5). By these pairs of lengthwise frames 71 and 72 and lateral frames 75 and 76, the frame portion 60 which is continuous all around each of the frame units is formed. As shown in FIGS. 5 to 8, in each of the frame units, rear ends 40d of the tail portions 40b of the flexure elements 40' are connected to each other by the first lateral frame 75.

A slit 80, a connection portion 81, and recesses 82 and 83 are formed between the frame units $51_1$ and $51_2$ which are adjacent longitudinally relative to the flexure chain blank sheet 50 (as indicated by double-headed arrow X in FIG. 5). The slit 80 has a first opening width G1 (FIG. 6). The slit 80 is formed between the first lateral frame 75 of the frame unit 51₁, which is one of the adjacent frame units, and the second lateral frame 76 of the other frame unit 51₂. The slit 80 extends longitudinally along the lateral frames 75 and 76.

The connection portion 81 and the recesses 82 and 83 are formed in the first lateral frame 75. The connection portion 81 connects the first lateral frame 75 of the frame unit 51₁ on one side and the second lateral frame 76 of the frame unit 51₂ of the other side to each other. The connection portion 81 is formed in at least two places at intervals laterally relative to the frame portion 60 (as indicated by double-headed arrow Y in FIG. 5). The connection portions 81 each have a portion-to-be-cut 91 which is to be cut by a cutter.

Recesses 82 and 83 are formed on both sides of each of the connection portions 81. Each of these recesses 82 and 83 has a second opening width G2 (FIG. 6). The second opening width G2 is greater than the first opening width G1. Moreover, the second opening width G2 is greater than the thickness of the cutter. The first opening width G1 is less than the thickness of the cutter. That is, the recesses 82 and 83 have the shape and size which allow the cutter to be inserted therein.

Further, at a position different from where the connection portion 81 is formed, a circular first positioning hole 100 is formed in the first lateral frame 75. Width W1 (FIGS. 6 and 7) of the first lateral frame 75 is greater than the diameter of the first positioning hole 100. Width W1 in this specification refers to a width dimension which is orthogonal to the longitudinal dimension of the first lateral frame 75. In the manufacturing process of the flexure 40, in order to keep the flexure chain blank sheet 50 at a predetermined position, a first positioning pin may be inserted into the first positioning hole 100.

The first lateral frame 75 connects between the tail portions 40b of the flexure elements 40' in each of the frame units. A portion-to-be-cut 105 (indicated by a two-dot chain line in FIG. 8) which is to be cut when the tail portions 40b are separated from the first lateral frame 75 is provided between the tail portions 40b and the first lateral frame 75.

Figure 10:
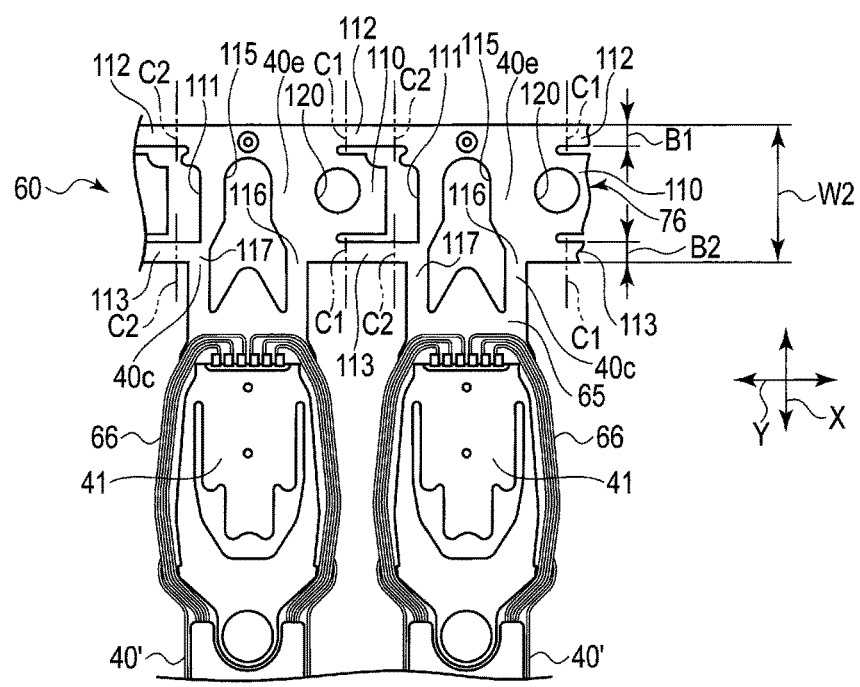
FIG. 10 is an enlarged plan view of a part near distal end portions of flexure elements of one of frame units which have been separated.
Figure 11A:
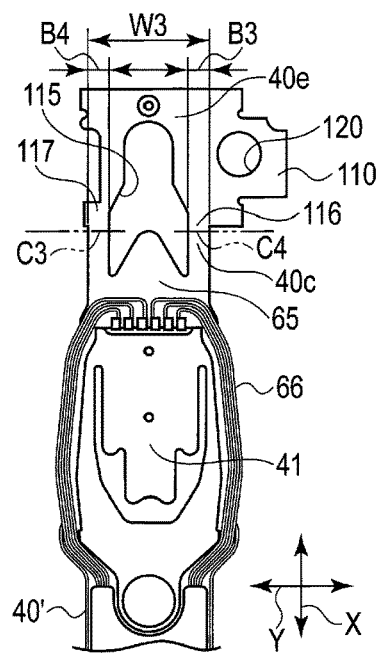
FIG. 11A is a plan view of a part near a distal end portion of a flexure element from which first cut-off portions shown in FIG. 10 have been cut.
Figure 11B:
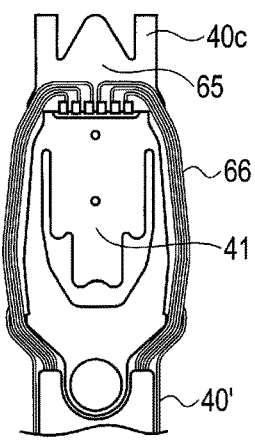
FIG. 11B is a plan view of a part near the distal end portion of the flexure element from which second cut-off portions have been cut.

Likewise the first lateral frame 75, the second lateral frame 76 extends laterally relative to the flexure element 40' (as indicated by double-headed arrow Y in FIGS. 5 and 10). The second lateral frame 76 is constituted by a distal end linking portion 110 structured by connecting between extending portions 40e of the flexure elements 40' formed in each of the frame units. The extending portions 40e extend longitudinally (i.e., in the direction indicated by double-headed arrow X in FIGS. 5 and 10) from distal end portions 40c of the flexure elements 40', respectively.

Figure 7:
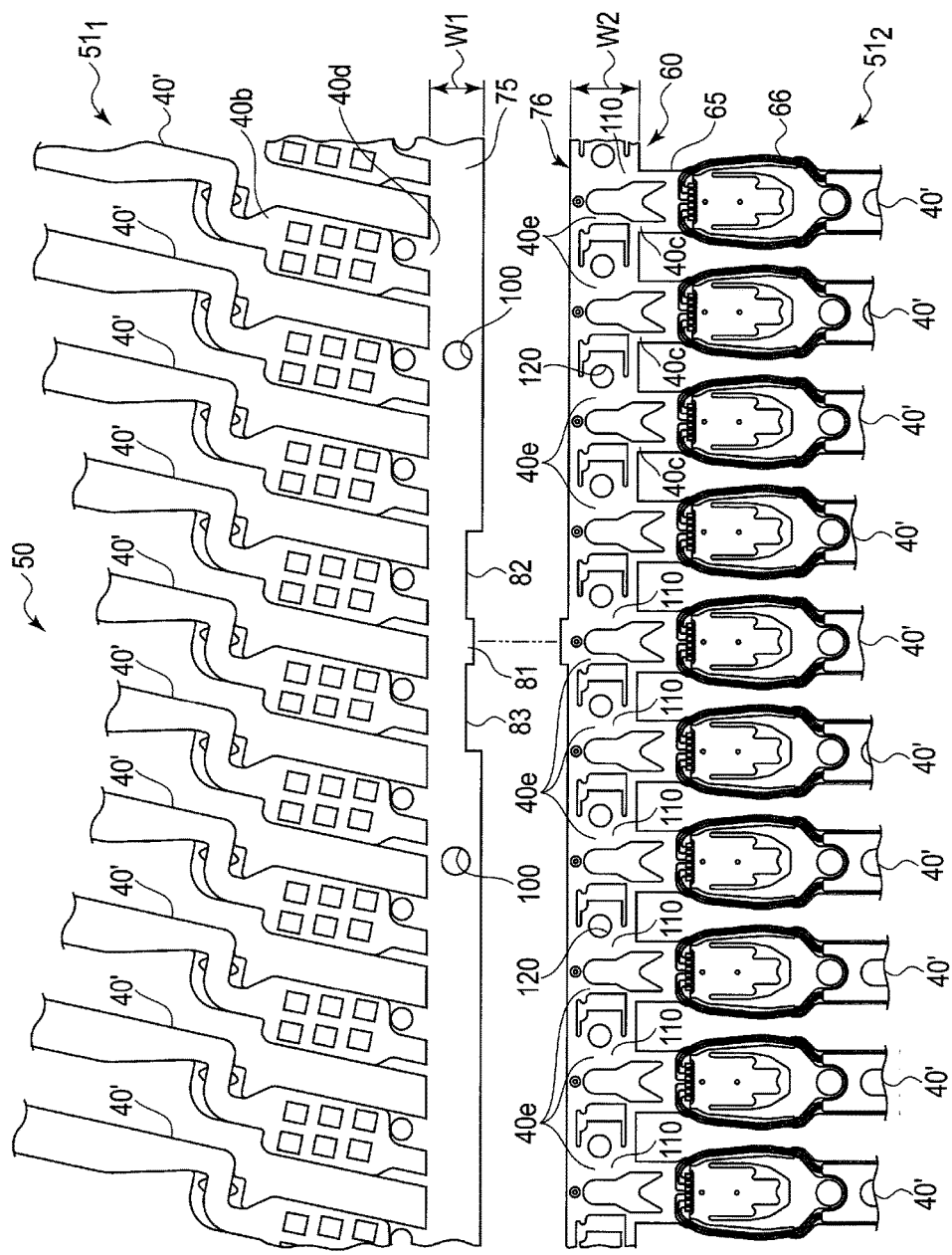
FIG. 7 is a plan view of a state in which frame units of the flexure chain blank sheet shown in FIG. 5 are separated from each other.
Figure 8:
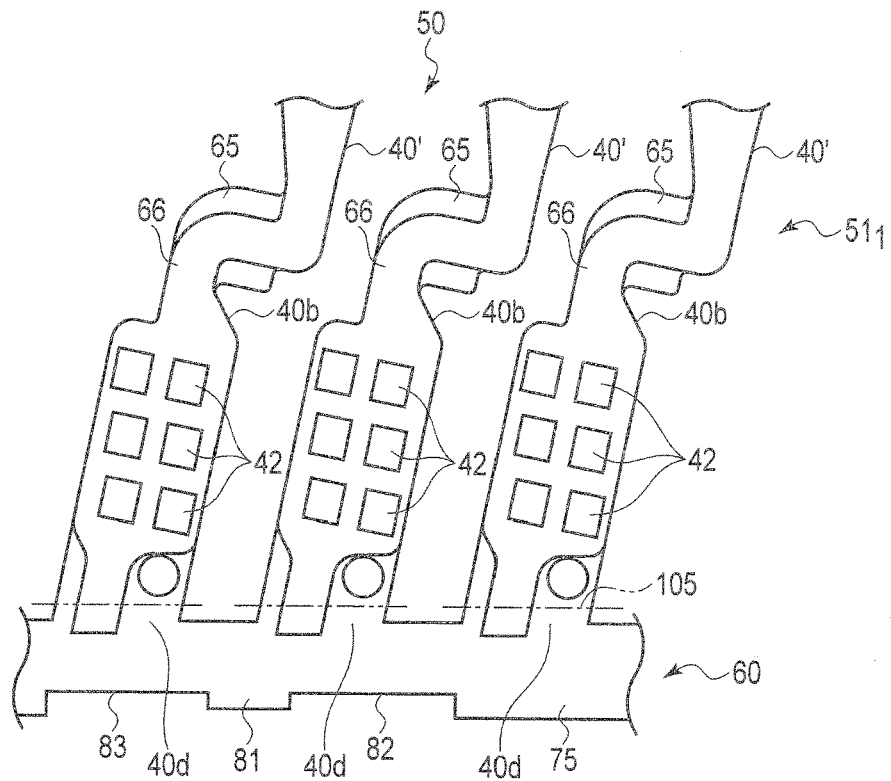
FIG. 8 is an enlarged plan view of a part near tail portions of flexure elements of one of frame units which have been separated.

As shown in FIGS. 6, 7, and 10, a first opening 111 is formed in the distal end linking portion 110. The first opening 111 is formed between the adjacent extending portions 40e of the flexure elements 40'. A pair of first bridge portions 112 and 113 is formed facing the first opening 111. The first bridge portions 112 and 113 connect the adjacent extending portions 40e to each other. Widths B1 and B2 (FIG. 10) of the respective first bridge portions 112 and 113 are both less than width W2 of the second lateral frame 76. Width W2 in this specification refers to a width dimension which is orthogonal to the longitudinal dimension of the second lateral frame 76.

Each of first cut-off portions C1 and C2 (shown by two-dot chain lines in FIG. 10) is provided in the first bridge portions 112 and 113. The first cut-off portions C1 and C2 are cut longitudinally relative to the flexure element 40' (i.e., in the direction indicated by double-headed arrow X) between the adjacent extending portions 40e of the flexure elements 40'.

Widths B1 and B2 of the respective first bridge portions 112 and 113 are both sufficiently less than width W2 of the second lateral frame 76, being less than half of width W2. Accordingly, cutting the first cut-off portions C1 and C2 individually is easier than cutting the entire length over width W2 of the second lateral frame 76.

A second opening 115 is formed in each of the extending portions 40e of the flexure elements 40'. Second bridge portions 116 and 117 facing the second opening 115 are formed on both sides of the second opening 115. The second bridge portions 116 and 117 extend to the distal end portion 40c of the flexure element 40'.

Second cut-off portions C3 and C4 (shown by two-dot chain lines in FIG. 11A) are provided in the second bridge portions 116 and 117. The second cut-off portions C3 and C4 are cut laterally relative to the flexure element 40' (i.e., in the direction indicated by double-headed arrow Y) between the distal end portion 40c and the extending portion 40e.

Widths B3 and B4 (FIG. 11A) of the second bridge portions 116 and 117 are both sufficiently less than width W3 of the extending portion 40e, being less than half of width W3. Accordingly, cutting the second cut-off portions C3 and C4 individually is easier than cutting the entire length over width W3 of the extending portion 40e.

Further, for each of the flexure elements 40', a second positioning hole 120 is formed in the extending portion 40e. The second positioning holes 120 are formed laterally relative to the frame portion 60 (as indicated by double-headed arrow Y in FIG. 5) at a predetermined pitch. Width W2 (FIGS. 6 and 7) of the second lateral frame 76 is greater than the diameter of the second positioning hole 120. In the manufacturing process of the flexure 40, in order to keep the flexure elements 40' at predetermined positions, second positioning pins may be inserted into the second positioning holes 120.

Figure 9:
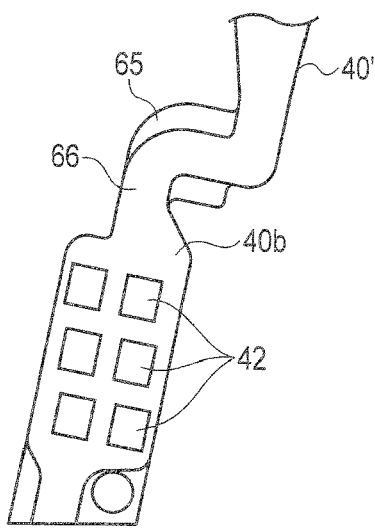
FIG. 9 is a plan view of a tail portion which has been separated from a lateral frame of the frame unit shown in FIG. 8.

The portion-to-be-cut 105 (FIG. 8) of the tail portion 40b of the flexure chain blank sheet 50 of the present embodiment is cut by a cutter. When the portion-to-be-cut 105 is cut, the tail portion 40b is separated from the first lateral frame 75, as shown in FIG. 9.

As described above, the first cut-off portions C1 and C2 are provided in the first bridge portions 112 and 113 of the distal end linking portion 110 which constitutes the second lateral frame 76. When the first cut-off portions C1 and C2 are cut longitudinally relative to the flexure element 40' (as indicated by double-headed arrow X in FIG. 10) by the cutter, a flexure element 40' comprising the extending portion 40e (FIG. 11A) is obtained.

Further, the second cut-off portions C3 and C4 are provided in the second bridge portions 116 and 117. When the second cut-off portions C3 and C4 are cut laterally (as indicated by double-headed arrow Y in FIG. 11A) by the cutter, a flexure element 40' (FIG. 11B) is obtained. The extending portion 40e which has been removed by cutting is treated as scrap.

Depending on an apparatus or a jig to be used in the manufacturing process of the flexure, the size (length and width) of a single flexure chain blank sheet may be restricted. In that case, once the length of the flexure chain blank sheet exceeds a permissible value if only a little, the number of frame units which can be formed in a flexure chain blank sheet must be reduced by one. In one frame unit, several tens to several hundreds of flexure elements formed by etching are arranged at a predetermined pitch. Accordingly, reducing the frame unit by one means reducing several tens to several hundreds of flexures per flexure chain blank sheet. Accordingly, there arises a problem that the manufacturing efficiency of flexures is drastically reduced.

In a conventional flexure chain blank sheet, apart from extending portions which extend longitudinally from distal end portions of flexure elements, a second lateral frame is formed. Accordingly, the conventional flexure chain blank sheet tends to have its frame portion widened. In contrast, in the flexure chain blank sheet 50 of the present embodiment, by connecting between the adjacent extending portions 40e of the flexure elements 40', the distal end linking portion 110 is structured. Further, this distal end linking portion 110 is utilized as the second lateral frame 76. The first cut-off portions C1 and C2, and the second cut-off portions C3 and C4 are provided in the distal end linking portion 110. Accordingly, in comparison with the conventional flexure chain blank sheet, the flexure chain blank sheet 50 of the present embodiment has enabled the size (in particular, the length) of the frame portion 60 to be reduced.

According to the flexure chain blank sheet 50 of the present embodiment, even if the length of the flexure element is slightly increased according to the change in the specification of the flexure, it is possible to secure the same number of frame units as the conventional frame units within an allowable dimension of a single flexure chain blank sheet 50. That is, it is possible to prevent the number of flexure elements 40' formed on a single flexure chain blank sheet from being reduced. Accordingly, it is possible to form as many flexure elements 40' as possible on a single flexure chain blank sheet 50, and flexure 40 can be manufactured efficiently.

Also, needless to say, in carrying out the present invention, as well as the specific shape of the flexure element, each of the elements which constitute the flexure chain blank sheet may be modified variously, such as modifying the number and arrangement of the frame unit and flexure element, and the shape of the first and second bridge portions, the first and second openings, and the first and second cut-off portions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flexure chain blank sheet for a disk drive suspension comprising a plurality of frame units, each of the frame units comprising:

a frame portion made from a stainless steel plate; and a plurality of flexure elements arranged at a predetermined pitch within the frame portion, each of the plurality of flexure elements comprising a metal base formed from the stainless steel plate and a conductive circuit portion provided on the metal base, and each of the plurality of flexure elements having a distal end portion and a tail portion, wherein the frame portion comprises:

a pair of lengthwise frames extending in a longitudinal direction of the plurality of flexure elements;

a first lateral frame which extends in a width direction of the plurality of flexure elements and is connected to the tail portion of each of the plurality of flexure elements;

a second lateral frame comprising a plurality of extending portions and a plurality of distal end linking portions, each of the plurality of distal end linking portions connecting two adjacent extending portions of the plurality of extending portions, and each of the plurality of extending portions being connected to the distal end portion of one of the plurality of flexure elements;

a first opening formed in each of the plurality of distal end linking portions, such that each of the plurality of distal end linking portions comprises first bridge portions on opposite sides of the first opening, the first bridge portions connecting between the two adjacent extending portions which the distal end linking portion connects; and a second opening formed in each of the plurality of extending portions, such that each of the plurality of extending portions comprises second bridge portions on opposite sides of the second opening, the second bridge portions connecting to the distal end portion of one of the plurality of flexure elements, wherein the first bridge portions of each distal end linking portion include first portions-to-be-cut, which can be cut along the longitudinal direction, between the two adjacent extending portions which the distal end linking portion connects, and wherein the second bridge portions of each extending portion include second portions-to-be-cut, which can be cut along the width direction, between the extending portion and the distal end portion connected thereto.

2. The flexure chain blank sheet of claim 1, further comprising a first positioning hole formed in the first lateral frame, and a second positioning hole formed in each of the extending portions.

* * * * *